United States Patent
Cmielowski et al.

(10) Patent No.: US 11,556,860 B2
(45) Date of Patent: Jan. 17, 2023

(54) CONTINUOUS LEARNING SYSTEM FOR MODELS WITHOUT PIPELINES

(71) Applicant: International Business Machines Corporation, Armonk, NY (US)

(72) Inventors: Lukasz G. Cmielowski, Cracow (PL); Rafal Bigaj, Cracow (PL); Blazej Rafal Rutkowski, Cracow (PL); Wojciech Sobala, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 16/384,023

(22) Filed: Apr. 15, 2019

(65) Prior Publication Data

US 2020/0327457 A1    Oct. 15, 2020

(51) Int. Cl.
*G06N 20/20* (2019.01)
*G06K 9/62* (2022.01)
*G06F 17/18* (2006.01)

(52) U.S. Cl.
CPC .............. *G06N 20/20* (2019.01); *G06F 17/18* (2013.01); *G06K 9/6256* (2013.01)

(58) Field of Classification Search
CPC ....... G06N 20/20; G06F 17/18; G06K 9/6256
See application file for complete search history.

(56) References Cited

U.S. PATENT DOCUMENTS

| | | | |
|---|---|---|---|
| 9,418,337 B1 | 8/2016 | Elser et al. | |
| 11,375,176 B2 * | 6/2022 | Tseng | H04N 13/268 |
| 2015/0379426 A1 * | 12/2015 | Steele | G06N 5/025 |
| | | | 706/12 |
| 2016/0180195 A1 * | 6/2016 | Martinson | G06K 9/628 |
| | | | 382/103 |
| 2017/0270674 A1 * | 9/2017 | Shrivastava | G06K 9/6256 |
| 2018/0096437 A1 | 4/2018 | Sun et al. | |
| 2018/0158552 A1 | 6/2018 | Liu et al. | |
| 2018/0197111 A1 | 7/2018 | Crabtree et al. | |
| 2018/0357543 A1 * | 12/2018 | Brown | G06F 30/20 |

(Continued)

OTHER PUBLICATIONS

Roth et al., "Active Learning for Pipeline Models," AAAI-08 Conference on Artificial Intelligence, Jul. 2008, 6 pages. http://http://www.kevinsmall.org/pdf/RothSm08.pdf.

(Continued)

*Primary Examiner* — Pinalben Patel
(74) *Attorney, Agent, or Firm* — Peter K. Suchecki (57) ABSTRACT

An ML root model format having a root model definition, is converted into an ML target model format not having the root model definition. A learning system is assigned to the root model definition that is convertible to the machine learning target model format. A new version of the root model definition is ported from the ML root model to the format of the ML target model to generate a new version of the machine learning target model after a learning iteration of the learning system. Quality limits are determined using an X control chart method based on a cross-validation of fold results generated during a validation of the new version of the machine learning root model. A quality metric value of the new version of the ML target model is evaluated against the quality threshold values of the new version of the ML root model.

15 Claims, 6 Drawing Sheets

(56) References Cited

U.S. PATENT DOCUMENTS

2020/0320381 A1\* 10/2020 Venkatraman ....... G06Q 10/067
2021/0264321 A1\* 8/2021 Xiang ..................... G06N 5/04

OTHER PUBLICATIONS

Rajnoch, D., Future of Core ML model training, iOS App Develeopment, Sep. 25, 2017, 9 pages. https://medium.com/ios-os-x-development/future-of-core-ml-model-training-2c6fc97aa58a.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

CONTINUOUS LEARNING SYSTEM FOR MODELS WITHOUT PIPELINES

BACKGROUND

The disclosure relates generally to a machine learning format conversion, and more specifically, to a computer-implemented method for converting a machine learning root model format from a format having a pipeline to another format without a pipeline. The disclosure relates further to a related converting system for converting a machine learning root model format, and a computer program product.

The terms "artificial intelligence" (AI) and/or "machine learning" (ML) are used interchangeably herein. The fields of ML and AI are driving traditional technologies and also the applicability of computerized methods to tackle also problems which can not easily be coded in a procedural manner.

It has been proven that machine learning, or recently, "deep learning" (DL) techniques have eclipsed previous AI approaches and have depicted how elegantly, end-to-end differentiable functions can be taught to perform very complex tasks involving high-level perception abilities. Many of these DL techniques used deep neural networks that have to be trained with training data, typically in a supervised learning process.

Because the problems to be solved are comparably complex, the training data is not only fed to one single machine learning model but to a sequence of machine learning models, such that the output data of the first machine learning model is used as input data for the second machine learning model. Such an approach in machine learning is denoted as "pipelining". For example, a simple text document processing workflow might include several stages: (i) split each document text into words, (ii) convert each document words into a numerical feature vector, and (iii) a prediction model using the feature vectors and labels. Thus, in machine learning it is common to run a sequence of algorithms to process and learn from data.

However, a particular architecture can be required to pass output data of one model, one algorithm, as input data to another model, a second algorithm. ML pipelines use the concept of ML "DataFrames" for this data passing. A DataFrame can use an ML dataset which can hold to a variety of data types. For example, a DataFrame could tip different columns storing text, feature vectors, true labels, and predictions. For a transformation of one DataFrame to another DataFrame, typically, a transformer can be used. For this, an estimator can be instrumental. It is an algorithm which can be fit on a DataFrame to produce a transformer. For example, a learning algorithm can be an estimator which trains on a DataFrame and produces a model. Hence, to stay in the above sketched model, a pipeline chains multiple transformers and estimators together to specify an ML workflow. In some cases, an ML library can support building such pipelines. Other types of ML systems may not support such pipeline definitions. However, for a continuous learning approach the usage of pipelines can be essential.

A user matching system can be configured to employ a stage learning process including a user compatibility learning stage, an SMT learning stage, and a match optimization stage. A method can also include determining, by the deep learning processor and using the neural network, prediction data including predicted results for the measured or of the health metrics for each of the multiple combinations of the measured or observed health metrics based on the training data. However, these described methods generally stay within their data model to provide their predictions. Different machine learning models, e.g., pipeline enabled vs. not pipeline enabled, are not addressed. There can therefore be a need to overcome problems and incompatibilities between different machine learning models in order to allow a seamless continuous learning process.

SUMMARY

Embodiments can be directed towards a computer-implemented method for converting a machine learning root model format. The root model format can have a related root model definition which can be convertible into a machine learning target model format not having the root model definition. The method can include assigning a learning system to the root model definition that is convertible to a format compatible with the machine learning target model and porting a new version of the root model definition from the machine learning root model to the format of the machine learning target model to generate a new version of the machine learning target model, after a learning iteration of the learning system that generates a new version of the machine learning root model.

The method can further include determining quality threshold values using an X control chart method based on a cross-validation of fold results generated during a validation of the new version of the machine learning root model, and evaluating a quality metric values of the new version of the machine learning target model against the quality threshold values of the new version of the machine learning root model wherein the quality threshold values can be equal to the determined quality limits.

Embodiments can also be directed towards a converting system for converting a machine learning root model format. The root model format can have a related root model definition and can be converted into a machine learning target model format not having the root model definition. The system can include an assigning unit adapted for assigning a learning system to the root model definition that is convertible to a format compatible with the machine learning target model, and a porting module adapted for porting a new version of the root model definition from the machine learning root model to the format of the machine learning target model to generate a new version of the machine learning target model after a learning iteration of the learning system that generates a new version of the machine learning root model.

Additionally, the system can include a determination unit adapted for determining quality value threshold values using an X control chart method based on a cross-validation of fold results generated during a validation of the new version of the machine learning root model, and an evaluation module adapted for evaluating a quality metric value of the new version of the machine learning target model against the quality threshold values of the new version of the machine learning root model, wherein the quality threshold values can be equal to the determined quality limits.

The proposed computer-implemented method for converting a machine learning root model format can offer multiple advantages and technical effects. For example, it can become possible to use a machine learning model having pipeline capabilities linked to a machine learning system for a continuous learning approach and deploy the results to a machine learning model not having capabilities of the pipeline approach. This can significantly enhance the options for machine learning models not equipped with pipeline capabilities. Such limited machine learning models can be used in systems with limited computing capacity. Hence, using the proposed concept, it becomes possible to apply the continues learning process also to those machine learning models not having the underlying computing power nor the pipeline approach available.

It can also be ensured that at deployment of a new ML model originating from the source ML model to a target environment, i.e., the target machine learning model not having pipeline capabilities, can only be performed if given error parameter boundaries or quality limits are not crossed by applying a comparison between the quality of pipeline model with the quality of a model without a pipeline. Thus, the target machine learning model needs, after the conversion, to be at least as good as the source machine learning model having the pipeline.

Additional embodiments of the inventive concept, applicable to the method as well as the related system, and the related computer-program product, will be described herein. According to embodiments, the machine learning root model can include at least one selected out of the following machine learning frameworks: "keras," "scikit-learn," "xgboost," and "caffe." These ML frameworks represent already a set of powerful tools for a continuous machine learning approach. Other ML frameworks also supporting a continuous machine learning approach can be used as part of the method instead of the above-listed ones.

In embodiments, the method can also include deploying the machine learning target model only if a determined quality parameter value of the machine learning target model stays within the determined quality limits of the new version of machine learning root model. Thus, if one of the determined quality parameter values of the machine learning target model is not within the given limits, the current version of the machine learning target model can be used instead. Thus, no version change of the target model can be accepted that can stay below given quality standards.

In some embodiments, the method can also include using a number "k" of folds of training data for the validation of the new version of the machine learning root model resulting in k quality metric values. If, for example, k=2, it can result in a first quality metric value, e.g., 0.7, and a second quality metric value, e.g., 0.8.

In some embodiments, the determination of quality limits can include determining an upper control limit (UCL), where UCL=average (k quality metric values)+R*A2, where R=max (k quality metric values)−min (k quality metric values), and A2=correction constant, which can be available from statistic, a source for the correction constant can be found here: http://web.mit.edu/2.810/www/files/readings/ControlChartConstantsAndFormulae.pdf. The used algorithm can be straight forward and can not require significant computing resources.

Accordingly, and embodied in another exemplary implementation of the method, the determination of quality limits can also include determining a lower control limit (LCL), where LCL=average (k quality metric values)−R*A2, wherein R=max (k quality metric values)−min (k quality metric values), and A2=a correction constant. Also here, A2 can be available from statistical tables. It can also be noted that the value of A2 can only depend on the number of measurements.

In some embodiments, the determined quality parameter can be determined by building an average value of the k quality metric values relating to the k folds of data. This approach can work as a balancing approach so that very diverse results can be smoothed or averaged.

In some embodiments, the method can also include generating an alert indicative of the fact that either the quality metric value of the new version of the machine learning root model and/or the quality metric value of the new version of the machine learning target model stay outside the quality limits. The form of the alert can have different appearances; it can, for example, be an audio alert or a pop-up message in a programmer development environment.

In some embodiments of the method, the same k folds of training data can be used to determine the quality metric value of the new version of the machine learning target model and the new version of the machine learning root model. Thus, a biased training data set favorable by only one of the two machine learning models and/or a specific cluster of training data can be avoided.

Furthermore, embodiments can take the form of a related computer program product, accessible from a computer-usable or computer-readable medium providing program code for use, by, or in connection, with a computer or any instruction execution system. For the purpose of this description, a computer-usable or computer-readable medium can be any apparatus that can contain means for storing, communicating, propagating or transporting the program for use, by, or in connection, with the instruction execution system, apparatus, or device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

It should be noted that embodiments of the present disclosure are described with reference to different subject-matters. In particular, some embodiments are described with reference to method type claims, whereas other embodiments are described with reference to apparatus type claims. However, one of skill in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

While the disclosure is amenable to various modifications and alternative forms, specifics thereof have been depicted by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, steps, and processes.

DETAILED DESCRIPTION

In the context of this description, the following conventions, terms and/or expressions can be used:

The term "machine learning root model format" can denote a feature describing the format of a ML model, in particular the format of the ML root model.

The term "root model definition" can be used to denote a set of variables and algorithms setting the framework for machine learning environment. It can be understood as a mathematical model describing a system using mathematical concepts and language. The process of developing a mathematical model can be termed "mathematical modeling." A mathematical model can help to explain a system and to study the effects of different components, and to make predictions about responses, output data, to stimulators, input data.

The term "machine learning target model format" can denote a format, set of variables and algorithms, being characterizing for the ML target model. It can be the corresponding entity of the root model format.

The term "learning system" can be used to denote a set of components allowing to implement machine learning which are algorithms in order to build a mathematical model of sample data, known as "training data", in order to make predictions or decisions without being explicitly programmed, i.e., without being procedurally programmed, to perform the task, i.e., a prediction.

The term "convertible" can be used to denote that a machine learning model can be transformable and be made compatible with another machine learning model, the first being the source machine learning model and the second one being the target machine learning model.

The term "new version," in particular a new version of a machine learning model, can denote that a new training can have happened and that the ML model behaves after the new training of the new training data.

The term "cross-validation," also known as "rotation estimation" or "out-of-sample testing", can denote any of various similar model validation techniques for assessing how the results of a statistical analysis will generalize to an independent data set. It is generally used in settings where the goal is prediction, and one wants to estimate how accurately a predictive model will perform in practice. In a prediction problems, a model is usually given a dataset of known data on which training is run, training dataset, and a dataset of unknown data, or first seen data, against which the model is tested, called the validation dataset or testing set. The goal of cross-validation is to test the model's ability to predict new data that was not used in estimating it, in order to flag problems like overfitting or selection bias and to give an insight on how the model will generalize to an independent dataset, i.e., an unknown dataset, for instance from a real problem.

The term "fold results" can denote a set of prediction values of an ML model using the validation data in the related fold as input value. For each input value, or input vector, the ML model, e.g., implemented as a deep neural network, can generate one output value, or an output vector. The individual output values can be averaged to build one final output value in order to compare it against a threshold value.

The term "validation" can denote the process of testing an ML model with validation date after the ML model has been trained with training data.

The term "keras" can denote the open source neural network library written in Python. It can be capable of running on top of TensorFlow, Microsoft Cognitive Toolkit, or Theano. Designed to enable fast experimentation with deep neural networks, it focuses on being user-friendly, modular, and extensible. It was developed as part of the research effort of project ONEIROS (Open-ended Neuro-Electronic Intelligent Robot Operating System).

The term "scikit-learn" can denote the free software machine learning library for the Python programming language. It features various classification, regression and clustering algorithms including support vector machines, random forests, gradient boosting, k-means and DBSCAN, and is designed to interoperate with the Python numerical and scientific libraries NumPy and SciPy.

The term "xgboost" can denote the open-source software library which provides a gradient boosting framework for C++, Java, Python, R, and Julia. It is operable on the operating systems Linux, Windows, and macOS. From the project description, it aims to provide a "Scalable, Portable and Distributed Gradient Boosting (GBM, GBRT, GBDT) Library". Other than running on a single machine, it also supports the distributed processing frameworks Apache Hadoop, Apache Spark, and Apache Flink.

The term "caffe" (Convolutional Architecture for Fast Feature Embedding) can denote the deep learning framework, originally developed at University of California, Berkeley. It is open source, under a BSD license. It is written in C++, with a Python interface.

The term "X control chart method," also known as Shewhart charts, after Walter A. Shewhart, or process-behavior charts, generally speaking, can denote a statistical process control tool used to determine whether a process can be in a state of control. Here, it can be used to control whether an output value, or vector, of a machine learning model stays within a given range. The range, i.e., related upper and lower threshold values, can be defined by the predicting quality of the root model. The prediction quality of the target ML model can be tested against these threshold values.

This can be translated to the here proposed method to "determine how good a machine learning model can anticipate the reality as measured." The machine learning model can be an abstract mathematical model of a real situation, the model having a plurality of parameters that can be tuned in order to come closer to real measured values given a set of input variables.

In some embodiments, the method can also include determining an upper control limit (UCL), where UCL=ave+range*A2, where ave=$\Sigma\ a_i/k$, range=max[$a_i$]−min[$a_i$], i=1..k, and A2 can be a statistical constant for the X control method depending on the number of model quality values.

The so-determined upper control limit can be used determine whether the quality of the target model, in particular after a porting of the source or root ML model to the target ML model, stays also below the maximum quality limits or quality threshold value of the root ML model. The same can apply for the lower threshold value. The area between the lower and the upper threshold value defines the acceptable quality range or quality band the target model must fulfill in order to be deployed.

In the following, a detailed description of the figures will be given. All instructions in the figures are schematic. Firstly, a block diagram of an embodiment of the inventive computer-implemented method for converting a machine learning root model format is given. Afterwards, further embodiments, as well as embodiments of the converting system for converting a machine learning root model format, will be described.

Figure 1:
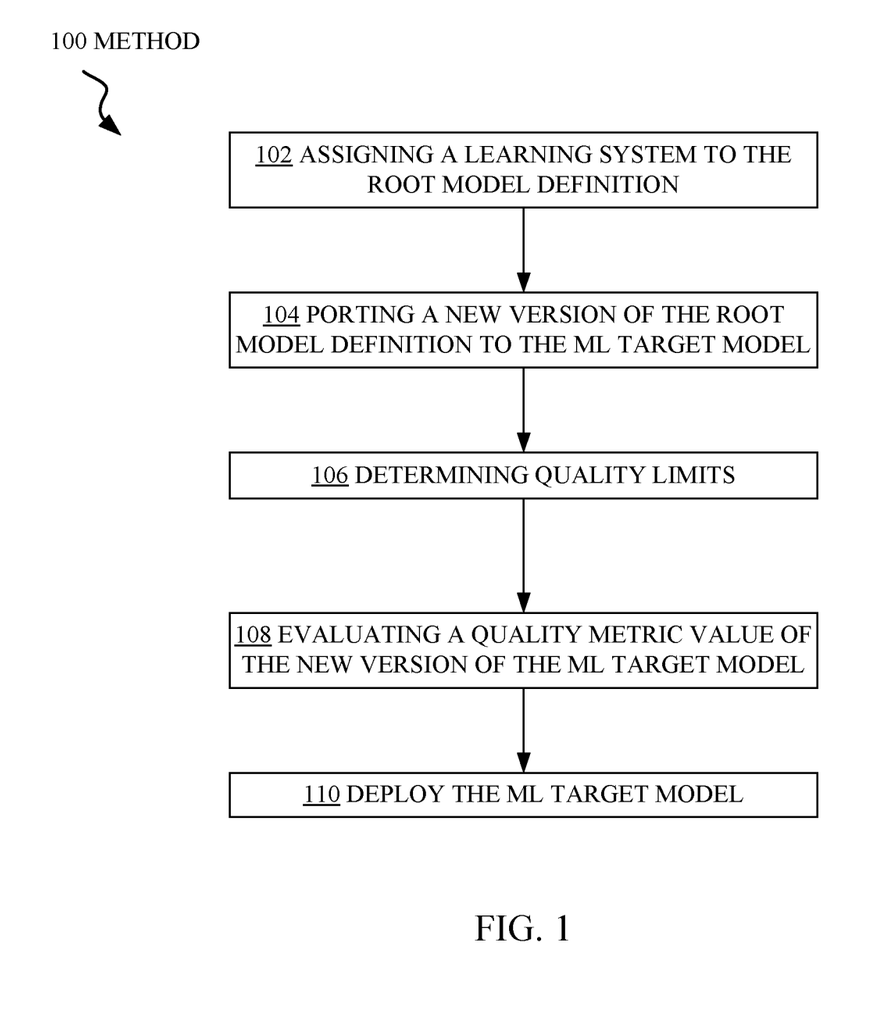
FIG. 1 depicts a block diagram of an embodiment of the a computer-implemented method for converting a machine learning root model format into a target format, according to embodiments of the present disclosure.

FIG. 1 is a flow diagram of a computer-implemented method for converting a machine learning root model format into a machine learning target model format not having the root model definition. The root format has a related root model definition. The method 100 includes assigning, 102, a learning system to the root model definition that is convertible to a format compatible with the machine learning target model.

The method 100 also includes porting, 104, a new version of the root model definition from the machine learning root model to the format of the machine learning target model to generate a new version of the machine learning target model, after a learning iteration of the learning system that generates a new version of the machine learning root model.

The method 100 includes determining, in operation 106, quality limits, in particular upper and lower limits using the known X control chart method based on a cross-validation of fold results generated during a validation of the new version of the machine learning root model, and evaluating, 108, a quality metric value of the new version of the machine learning target model against the quality threshold values of the new version of the machine learning root model. Only if the determined quality metric value of the ML target model stays within the quality limits of the ML root model, the target model definition will be deployed, 110, in the ML environment for which no pipeline framework exists, wherein the quality threshold values are equal to the determined quality limits.

Figure 2:
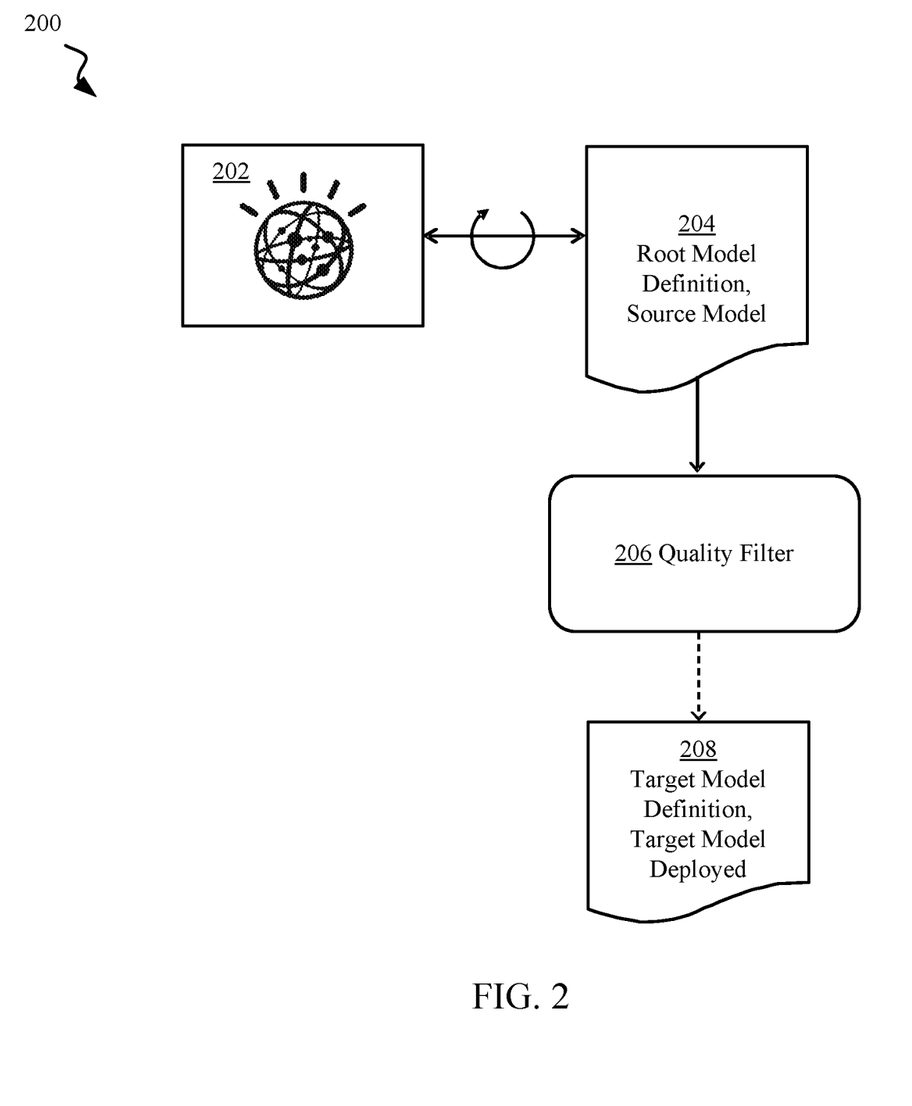
FIG. 2 depicts a block diagram of a deployment flow underlying the proposed concept, according to embodiments consistent with the figures.

FIG. 2 depicts a block diagram 200 illustrating a deployment flow underlying the proposed concept. An ML root model 204 with pipeline support, also denoted as source model definition, can be trained using training data and a learning system, or framework, 202. The ML root model 204 can include a plurality of pipelined optimizers, eventually designed as a directed acyclic graph. The ML root model can be trained again and again, because new training data become available or because other trigger mechanisms are used. The newly trained model can be cross-validated and quality metrics values or threshold values can be generated.

These quality metric values can be used as a filter 206 mechanism for a ported ML root model to an ML target model. If the ML target model definition is validated using, for example, the same k folds of training/validation used for the ML root model, and if the determined quality value of the ported target model definition stays within the upper and lower limits of the ML root model, then the ported version can be deployed as target ML model definition 208; otherwise the current version of the target ML definition used will be continued.

Figure 3:
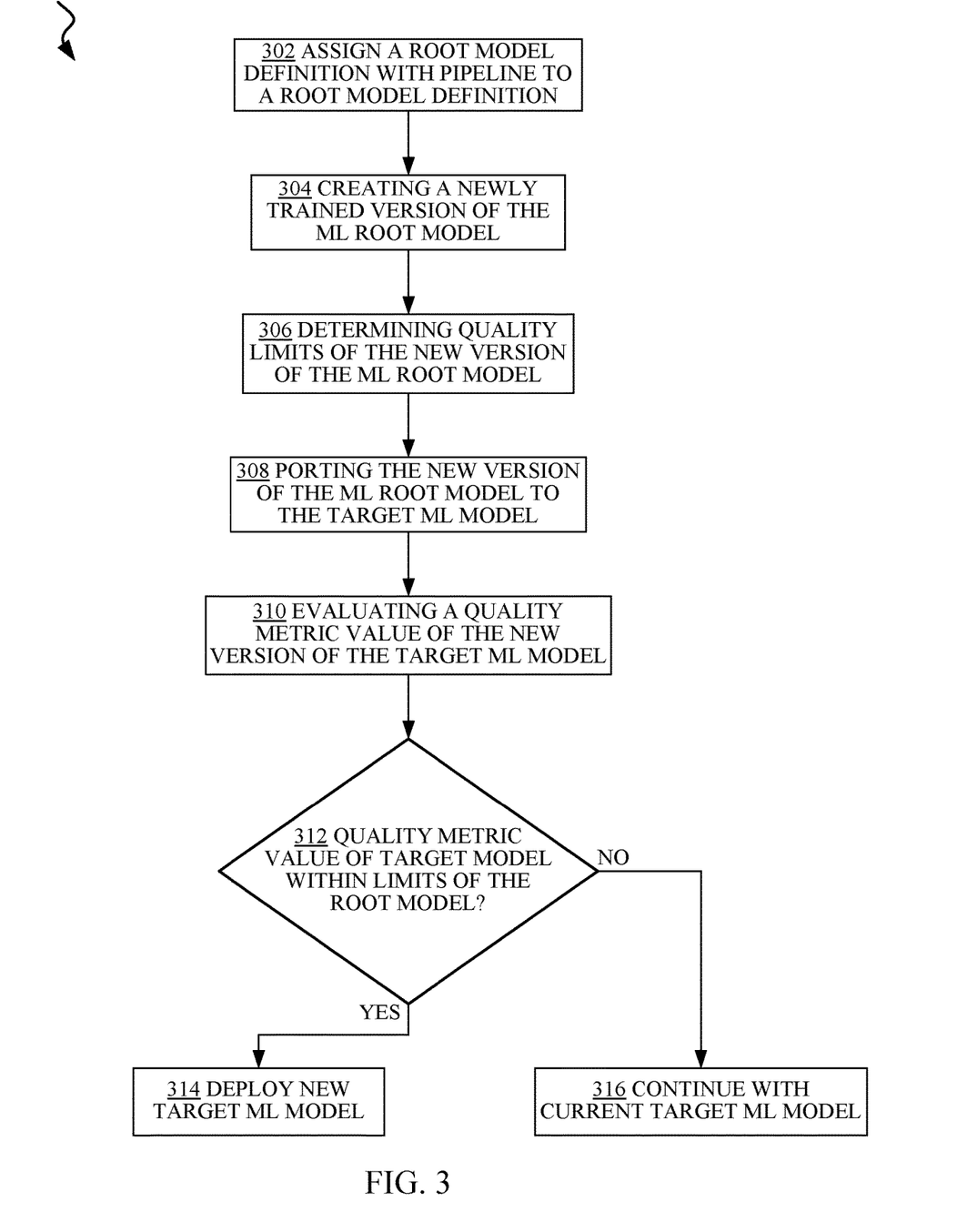
FIG. 3 depicts a flow chart of the inventive concept in a more implementation-near form, according to embodiments consistent with the figures.

FIG. 3 depicts a flow diagram 300 of the inventive concept in a more implementation-near form. In a first operation, a root model definition of a machine learning source model is assigned, 302, to a machine learning system, e.g., a framework of tools, editors, training data, etc. This machine learning model allows a continuous learning process using training data and/or validation data in a step-by-step approach. In a second operation, a newly trained version of the ML root model is created, 304. In a validation process this newly generated ML root model is validated against validation data. In this process, quality limit values, i.e., LCL and UCL, are determined, 306.

Then, the newly created version of the ML root model is ported, in operation 308, to the target machine learning model. This so newly generated target machine learning model is validated/evaluated, 310, against the quality metric value(s), i.e., LCL and UCL, of the machine learning root model. For this the same cave forwards of training/validation data can be used.

Then it is determined, 312, whether the quality metric value of the target model lies within the upper and lower limit of the machine learning root model. If that is the case, case "Y," the newly created target ML model, in particular by porting the new version of the ML root model, is deployed, 314. If the determination 312 has a negative outcome, case "N," one continues, 316, with the current target machine learning model because it seems to be that the then newly generated source ML model is not better than the old one, at least not in converted target ML model.

This way, machine learning models for which no pipelining framework exists can enjoy the benefits of another machine learning environment, i.e., the root model, and can also be updated on a regular basis, i.e., also in such limited ML environment a continuous learning process can be established.

Figure 4:
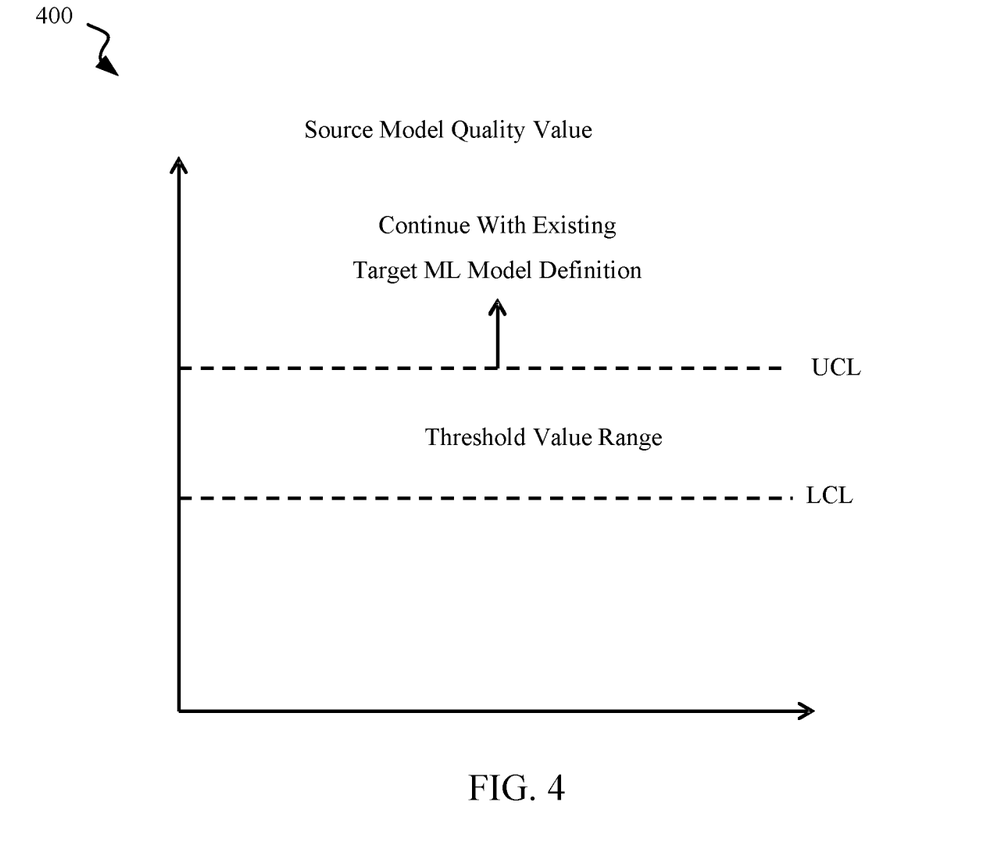
FIG. 4 is a depiction of a decision process whether to use the ported ML model definition, according to embodiments consistent with the figures.

FIG. 4 is another illustration 400 of the decision process whether to use the ported ML model definition. Depending on the model quality metric selected, either the lower control limit or the upper control limit is used as a threshold value for a determination whether the ported ML model, i.e., the target model, shall be deployed or not.

An example with real numbers can make the general concept a little more comprehensible. It can be assumed that the trained model is evaluated using a cross-validation with 3 fold, 3 sets of data. The related model quality metric values of the model can be 0.8, 0.85, 0.78. Based on those values upper and lower control limits, i.e., UCL, LCL, can be calculated (see formula above):

UCL=0.81+0.07×1.023=0.88;

LCL=0.81−0.07×1.023=0.73.

It should also be noted that the value 0, 81 is the mean value of the three average values of the folds. The value of the range of 0.07 is the maximum difference of the average values of the folds, i.e., 0.85−0.78=0.07. The value of 1.023 can be extracted from standard statistical tables known by a skilled person for the X control chart method.

Depending on the metric type, the quality threshold values are then set to UCL and LCL. These quality threshold values, derived from a validation of the root model, can then be used as quality threshold values for the ported target ML model.

Figure 5:
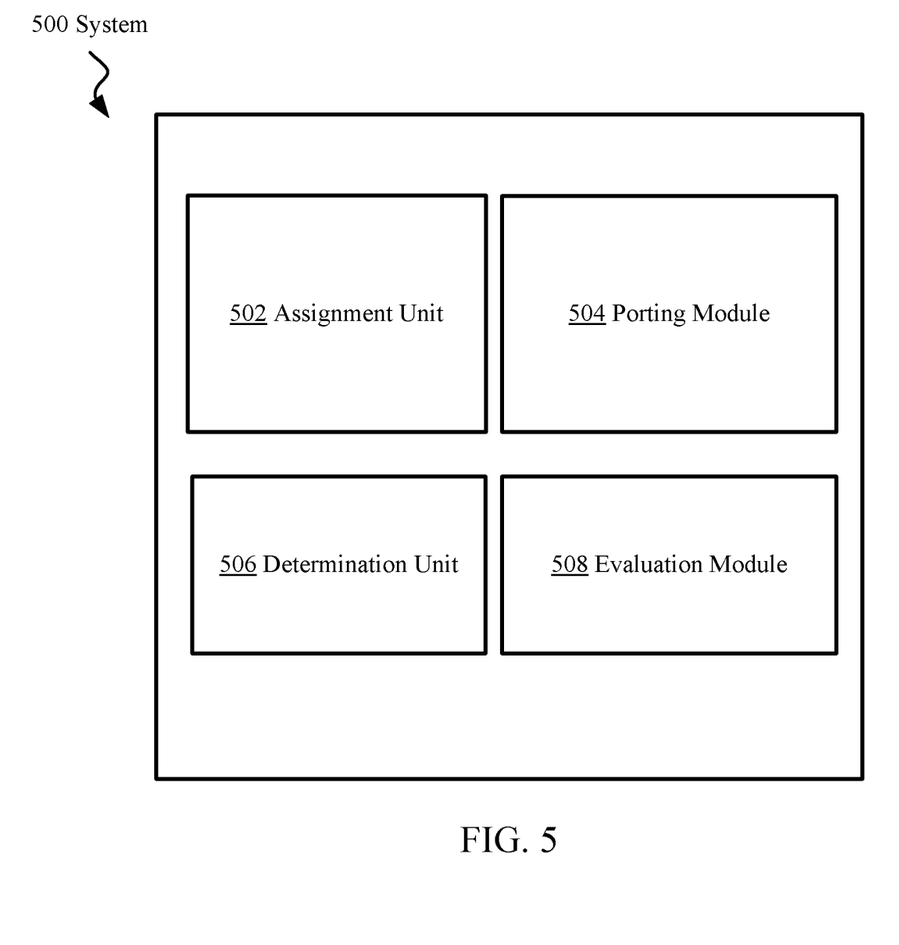
FIG. 5 is a block diagram depicting the converting system for converting a machine learning root model format to a target format.

For completeness reasons, FIG. 5 depicts a block diagram of an embodiment of the inventive conversion system 500 for converting a machine learning root model format into a target model format not having the root model definition, i.e., a different one.

The root format has a related root model definition. The system includes an assigning unit 502 adapted for assigning a learning system to the root model definition that is convertible to a format compatible with the machine learning target model, and a porting module 504 adapted for porting a new version of the root model definition from the machine learning root model to the format of the machine learning target model to generate a new version of the machine learning target model after a learning iteration of the learning system that generates a new version of the machine learning root model. Furthermore, the system includes a determination unit 506 adapted for determining quality limits using an X control chart method based on a cross-validation of fold results generated during a validation of the new version of the machine learning root model, and an evaluation module 508 adapted for evaluating a quality metric value of the new version of the machine learning target model against the quality threshold values of the new version of the machine learning root model, wherein the quality threshold values is equal to the determined quality limits.

Figure 6:
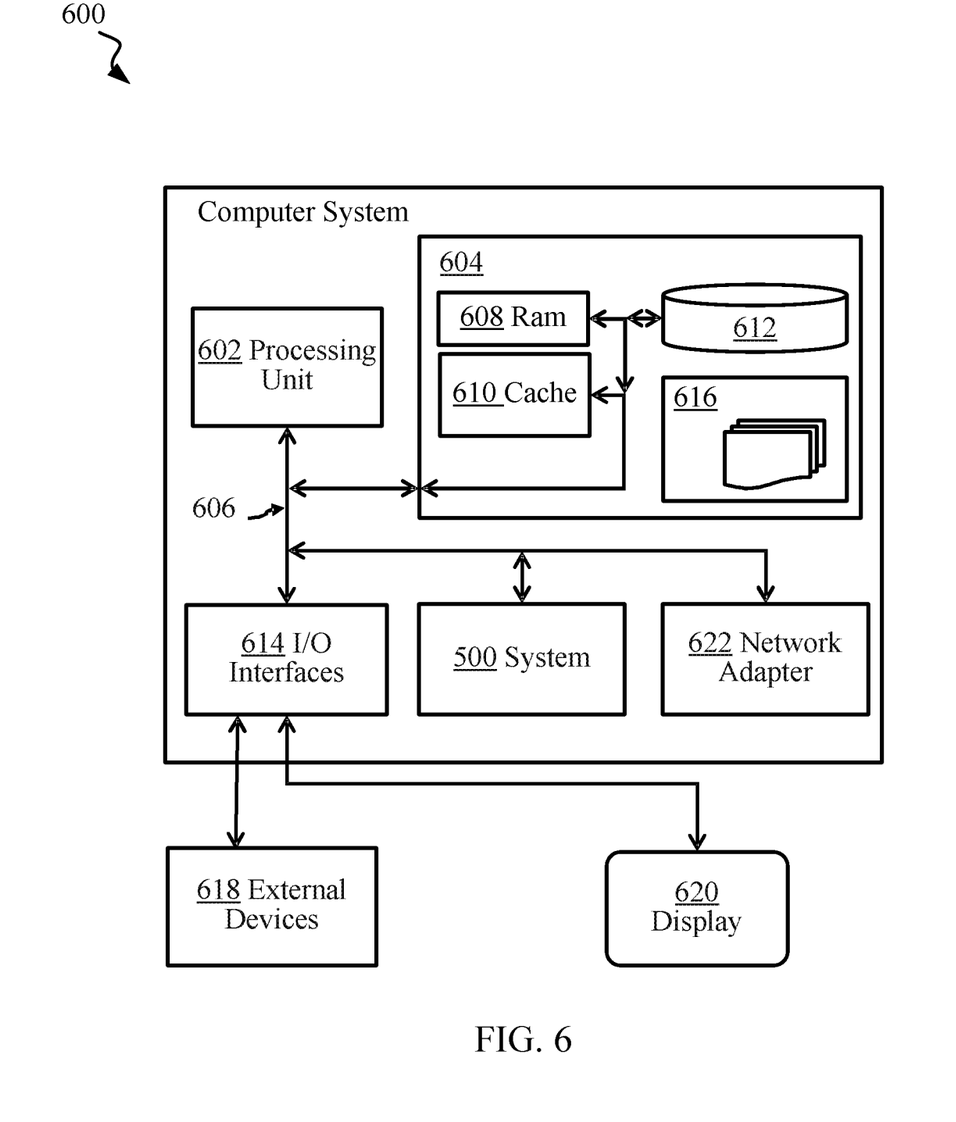
FIG. 6 depicts a computing system including the converting system of FIG. 5, according to embodiments consistent with the figures.

Embodiments of the disclosure can be implemented together with virtually any type of computer, regardless of the platform being suitable for storing and/or executing program code. FIG. 6 depicts, as an example, a computing system 600 suitable for executing program code related to the proposed method.

The computing system 600 is only one example of a suitable computer system, and is not intended to suggest any limitation as to the scope of use or functionality of embodiments of the disclosure described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that can be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 can be described in the general context of computer system-executable instructions, such as program modules, being executed by a computer system 600. Generally, program modules can include routines, programs, objects, components, logic, data structures, and so on that perform particular tasks or implement particular abstract data types. Computer system/server 600 can be practiced in distributed cloud computing environments where tasks are performed by remote processing devices that are linked through a communications network. In a distributed cloud computing environment, program modules can be located in both, local and remote computer system storage media, including memory storage devices.

As depicted in the figure, computer system/server 600 is depicted in the form of a general-purpose computing device. The components of computer system/server 600 can include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media can be any available media that is accessible by computer system/server 600, and it includes both, volatile and non-volatile media, removable and non-removable media.

The system memory 604 can include computer system readable media in the form of volatile memory, such as random access memory (RAM) 608 and/or cache memory 610. Computer system/server 600 can further include other removable/non-removable, volatile/non-volatile computer system storage media. By way of example only, a storage system 612 can be provided for reading from and writing to a non-removable, non-volatile magnetic media, not depicted and typically called a "hard drive." Although not depicted, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media can be provided. In such instances, each can be connected to bus 606 by one or more data media interfaces. As will be further depicted and described below, memory 604 can include at least one program product having a set, e.g., at least one, of program modules that are configured to carry out the functions of embodiments of the disclosure.

The program/utility, having a set, at least one, of program modules 616, can be stored in memory 604 by way of example, and not limiting, as well as an operating system, one or more application programs, other program modules, and program data. Each of the operating systems, one or more application programs, other program modules, and program data or some combination thereof, can include an implementation of a networking environment. Program modules 616 generally carry out the functions and/or methodologies of embodiments of the disclosure, as described herein.

The computer system/server 600 can also communicate with one or more external devices 618 such as a keyboard, a pointing device, a display 620, etc.; one or more devices that enable a user to interact with computer system/server 600; and/or any devices, e.g., network card, modem, etc., that enable computer system/server 600 to communicate with one or more other computing devices. Such communication can occur via Input/Output (I/O) interfaces 614. Still yet, computer system/server 600 can communicate with one or more networks such as a local area network (LAN), a general wide area network (WAN), and/or a public network, e.g., the Internet, via network adapter 622. As depicted, network adapter 622 can communicate with the other components of computer system/server 600 via bus 606. It should be understood that, although not depicted, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for converting a machine learning root model format be attached to the bus system 606.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer-readable storage medium, or media, having computer-readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider. In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flow diagram illustrations and/or block diagrams of methods, apparatus, systems, and computer program products of embodiments of the disclosure. It will be understood that each block of the flow diagram illustrations and/or block diagrams, and combinations of blocks in the flow diagram illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flow diagram and/or block diagram block or blocks.

The computer-readable program instructions may also be loaded onto a computer, other programmable data processing apparatuses, or another device to cause a series of operational steps to be performed on the computer, other programmable apparatus or other device to produce a computer-implemented process, such that the instructions which execute on the computer, other programmable apparatuses, or another device implement the functions/acts specified in the flow diagram and/or block diagram block or blocks.

The flow diagrams and/or block diagrams in the figures illustrate the architecture, functionality, and operation of possible implementations of systems, methods, and computer program products of various embodiments of the present disclosure. In this regard, each block in the flow diagram or block diagrams may represent a module, segment, or portion of instructions, which includes one or more executable instructions for implementing the specified logical function(s). In some alternative implementations, the functions noted in the block may occur out of the order noted in the figures. For example, two blocks depicted in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for converting a machine learning root model format, the root model format having a related root model definition, into a machine learning target model format not having the root model definition, the method comprising:

assigning a learning system to the root model definition, wherein the machine learning root model is convertible to a format compatible with the machine learning target model;

porting a new version of the root model definition from the machine learning root model to the format of the machine learning target model to generate a new version of the machine learning target model, after a learning iteration of the learning system that generates a new version of the machine learning root model;

determining quality limits using an X control chart method based on a cross-validation of fold results generated during a validation of the new version of the machine learning root model, wherein the validation uses k folds of training data for validating the new version of the machine learning root model resulting in k quality metric values, wherein determining the quality limits comprises determining an upper control limit (UCL) of UCL=average (k quality metric values)+ R*A2, and wherein R=max (k quality metric values)− min (k quality metric values), and A2=correction constant; and evaluating a quality metric value of the new version of the machine learning target model against quality threshold values of the new version of the machine learning root model, the quality threshold values being equal to the determined quality limits.

2. The method of claim 1, wherein the machine learning root model comprises at least one selected out of the machine learning frameworks keras, scikit-learn, xgboost, and caffe.

3. The method of claim 1, further comprising:
deploying the machine learning target model only if a determined quality parameter value of the machine learning target model stays within the determined quality limits of the new version of the machine learning root model.

4. The method of claim 1, wherein the determination of quality limits further comprises:
determining a lower control limit LCL of LCL=average (k quality metric values)−R*A2, wherein R=max (k quality metric values)−min (k quality metric values), and A2=correction constant.

5. The method of claim 1, wherein a determined quality parameter is determined by building an average value of the k quality metric values.

6. The method of claim 5, wherein the same k folds of training data are used to determine the quality metric value of the new version of the machine learning target model and the new version of the machine learning root model.

7. The method of claim 1, further comprising:
generating an alert indicative of the fact that either the quality metric value of the new version of the machine learning root model and/or the quality metric value of the new version of the machine learning target model stay outside the quality limits.

8. A converting system for converting a machine learning root model format, the root model format having a related root model definition, into a machine learning target model format not having the root model definition, the system comprising:
a processor; and
a computer-readable storage medium communicatively coupled to the processor and storing program instructions which, when executed by the processor, cause the processor to perform a method comprising:

assigning a learning system to the root model definition, wherein the machine learning root model is convertible to a format compatible with the machine learning target model;

porting a new version of the root model definition from the machine learning root model to the format of the machine learning target model to generate a new version of the machine learning target model, after a learning iteration of the learning system that generates a new version of the machine learning root model;

determining quality limits using an X control chart method based on a cross-validation of fold results generated during a validation of the new version of the machine learning root model, wherein the validation uses k folds of training data for validating the new version of the machine learning root model resulting in k quality metric values, wherein determining the quality limits comprises determining a lower control limit (LCL) of LCL=average (k quality metric values)−R*A2, and wherein R=max (k quality metric values)−min (k quality metric values), and A2=correction constant; and evaluating a quality metric value of the new version of the machine learning target model against the quality threshold values of the new version of the machine learning root model, the quality threshold values being equal to the determined quality limits.

9. The converting system of claim 8, wherein the machine learning root model comprises at least one selected out of the machine learning frameworks keras, scikit-learn, xgboost, and caffe.

10. The converting system of claim 8, wherein the method performed by the processor further comprises:

deploying the machine learning target model only if a determined quality parameter value of the machine learning target model stays within the determined quality limits of the new version of machine learning root model.

11. The converting system of claim 8, wherein the determination of the quality limits further comprises:

determining an upper control limit UCL of UCL=average (k quality metric values)+R*A2, wherein R=max (k quality metric values)−min (k quality metric values), and A2=correction constant.

12. The system of claim 8, wherein a determined quality parameter is determined by building an average value of the k quality metric values.

13. The system of claim 12, wherein the same k folds of training data are used to determine the quality of the new version of the machine learning target model and the new version of the machine learning root model.

14. The system of claim 8, wherein the method performed by the processor further comprises:

generating an alert indicative of the fact that either the quality metric value of the new version of the machine learning root model and/or the quality metric value of the new version of the machine learning target model stay outside the quality limits.

15. A computer program product for converting a machine learning root model format, the root model format having a related root model definition, into a machine learning target model format not having the root model definition, the computer program product comprising a computer-readable storage medium having program instructions embodied therewith, the program instructions being executable by one or more computing systems or controllers to cause the one or more computing systems to:

assign a learning system to the root model definition, wherein the machine learning root model is convertible to a format compatible with the machine learning target model;

port a new version of the root model definition from the machine learning root model to the format of the machine learning target model to generate a new version of the machine learning target model, after a learning iteration of the learning system that generates a new version of the machine learning root model;

determine quality limits using an X control chart method based on a cross-validation of fold results generated during a validation of the new version of the machine learning root model, wherein the validation uses k folds of training data for validating the new version of the machine learning root model resulting in k quality metric values, wherein determining the quality limits comprises determining an upper control limit (UCL) of UCL=average (k quality metric values)+R*A2, and wherein R=max (k quality metric values)−min (k quality metric values), and A2=correction constant; and evaluate a quality metric value of the new version of the machine learning target model against the quality threshold values of the new version of the machine learning root model, the quality threshold values being equal to the determined quality limits.

* * * * *